United States Patent
Smith et al.

(10) Patent No.: US 8,221,003 B2
(45) Date of Patent: Jul. 17, 2012

(54) BEARING UNIT AND PIVOT DEVICE

(75) Inventors: Robert Gordon Smith, Pathumthani (TH); Virat Sornsiri, Pathumthani (TH)

(73) Assignee: Seiko Instruments (Thailand) Ltd. (TH)

( * ) Notice: Subject to any disclaimer, the term of this patent is extended or adjusted under 35 U.S.C. 154(b) by 582 days.

(21) Appl. No.: 12/383,922

(22) Filed: Mar. 30, 2009

(65) Prior Publication Data

US 2009/0245712 A1 Oct. 1, 2009

(30) Foreign Application Priority Data

Mar. 31, 2008 (JP) .................................. 2008-089762

(51) Int. Cl.
*F16C 33/60* (2006.01)
(52) U.S. Cl. ......... 384/504; 384/520; 384/543; 384/490
(58) Field of Classification Search .................. 384/520, 384/537, 543, 490, 504
See application file for complete search history.

(56) References Cited

U.S. PATENT DOCUMENTS

| 6,010,247 | A | * | 1/2000 | Mouri et al. ................... 384/517 |
| 6,431,760 | B1 | * | 8/2002 | Nawamoto et al. ........... 384/513 |
| 2002/0039259 | A1 | | 4/2002 | Koyama et al. ............. 360/264.4 |
| 2002/0172443 | A1 | * | 11/2002 | Muraki et al. ................ 384/537 |
| 2004/0001657 | A1 | * | 1/2004 | Muraki et al. ................ 384/504 |
| 2004/0136630 | A1 | * | 7/2004 | Mori et al. .................... 384/504 |

* cited by examiner

*Primary Examiner* — Patrick Mackey
(74) *Attorney, Agent, or Firm* — Adams & Wilks

(57) ABSTRACT

A bearing unit has four rolling bearings adjacently disposed in an axial direction, each rolling bearing including an inner race, and outer race, and rolling elements interposed between the inner and outer races. A shaft is fitted to the inner races, and a sleeve has a fitting hole into which is fitted the outer races. The inner races or the outer races are brought into contract with each other in the axial direction to preload the rolling bearings. The inner races or the outer races of the rolling bearings at both axial ends, which are brought into contact with the inner races or the outer races of adjacent rolling bearings, are fixed to the sleeve, and the outer races of the central two rolling bearings form a radial gap between confronting surfaces of the sleeve and the outer races or between confronting surfaces of the shaft and the inner surfaces.

13 Claims, 12 Drawing Sheets

BEARING UNIT AND PIVOT DEVICE

BACKGROUND OF THE INVENTION

1. Field of the Invention

The present invention relates to a bearing unit and a pivot device including the bearing unit.

2. Description of the Related Art

Conventionally, there is known a magnetic disk device including a bearing unit provided with a swing arm, in which bearings are multi-staged in accordance with multi-staging of magnetic disks for increasing storage capacity of a hard disk drive, whereby the bearing unit supports a plurality of magnetic disks. In the magnetic disk device as described above, there is known a technology for configuring the bearing unit with a plurality of bearings for supporting multi-staged arms (for example, see JP 2002-100128 A).

In a magnetic disk device of JP 2002-100128 A, a spacer is disposed between a first pivot and a second pivot including a sleeve supported with respect to a shaft through an intermediation of upper and lower two bearings, and an actuator block including a head suspension is fixed to each of the sleeve of the first pivot and the sleeve of the second pivot.

However, in the case of a double-row roller bearing as in the conventional structure, preload for ensuring rigidity is dispersed to two roller bearings, and hence a large load is applied to the roller bearings. Therefore, the roller bearings have a short life. Further, for example, in the case of a quadruple-row roller bearing of the bearing unit, due to expansion and contraction of an adhesive applied between each outer race of all four rolling bearings and the sleeve, and the influence of precision of the outer races and the sleeve fitted to each other, circularity of a rolling contact surface of each outer race changes. The change of circularity of the rolling contact surface of each outer race results in application of stress with respect to the rolling element and the rolling contact surface, thereby causing a problem of unstable resonance and wave torque.

The present invention has been made in view of the above-mentioned problems, and it is an object of the present invention to provide a bearing unit having a long life and capable of stabilizing the torque and the resonance, and a pivot device including the bearing unit.

SUMMARY OF THE INVENTION

In order to achieve the above-mentioned object, the present invention provides the following means.

The present invention provides a bearing unit, including: four rolling bearings, which are disposed so as to be adjacent to each other in an axial direction, each of the four rolling bearings including an inner race and an outer race disposed coaxially with each other, and a plurality of rolling elements disposed between the inner race and the outer race with intervals in a circumferential direction; a first member, which is fitted to the inner race of each of the rolling bearings; and a second member, which includes a fitting hole into which the outer race of each of the rolling bearings is fitted, in which: the four rolling bearings are alternately disposed in the axial direction so that the inner races or the outer races thereof are brought into contact with each other in the axial direction while being disposed with intervals in the axial direction; the inner races or the outer races of the rolling bearings at both axial ends, which are brought into contact with the inner races or the outer races of the adjacent rolling bearings, are fixed to the first member or the second member; and the inner races or the outer races of the central two rolling bearings, which are disposed with intervals in the axial direction, are disposed so as to form a radial gap between the first member and the inner races or between the second member and the outer races.

According to the present invention, it is possible to apply preload to each pair of two rolling bearings which are axially adjacent to each other, by pressing the inner race or the outer race of each of rolling bearings at both axial ends, and the inner race or the outer race, of each of the central rolling bearings, which are disposed axially apart from the inner races or the outer races at both ends in a direction of being adjacent to each other.

In the bearing unit, a position of a first member or a second member which is separated in the axial direction is fixed by the inner race or the outer race of each of the rolling bearings at both axial ends, whereby it is possible to stably retain the first member or the second member.

In this case, the inner race or the outer race of each of the central two rolling bearings, which are disposed with intervals in the axial direction, have a radial gap between the first member or the second member and themselves, and are not fixed to the first member or the second member. Therefore, each circularity of the rolling contact surface of the inner race or the outer race does not change due to the expansion and contraction of an adhesive and the influence of accuracy between members, which are fitted to each other. Accordingly, stress is not applied to the each rolling contact surface of the inner race or the outer race and rolling elements of the central two rolling bearings. As a result, it is possible to stabilize the torque and the resonance as much as possible.

In the above-mentioned invention, a spacer may be sandwiched between the inner races or the outer races of the four rolling bearings, which are brought into contact with each other in the axial direction.

With this configuration, gap distances between the inner races or the outer races of the rolling bearings, which are disposed with intervals in the axial direction, are determined by lengths of spacers. Therefore, it is possible to apply preload to the rolling bearings only by pressing the inner races or the outer races disposed with intervals in the axial direction, in the direction of being adjacent to each other. Further, the preload is applied to four rolling bearings, and hence the preload applied to one rolling bearing can be reduced compared to the conventional structure in which the preload is applied to two rolling bearings. Therefore, the rolling bearings can have a long life.

The present invention provides a pivot device including a base member, a swing arm, and the bearing unit which supports the swing arm with respect to the base member so that the swing arm can freely rock.

According to the present invention, due to the bearing unit, it is possible to rock the swing arm with respect to the base member of the pivot device with stable torque and resonance.

The present invention achieves an effect of providing a rolling bearing having a long life, and in which the torque and the resonance are stabilized.

DETAILED DESCRIPTION OF THE PRESENT INVENTION

Hereinafter, a bearing unit according to an embodiment of the present invention and a pivot device including the bearing unit are described with reference to drawings.

Figure 1:
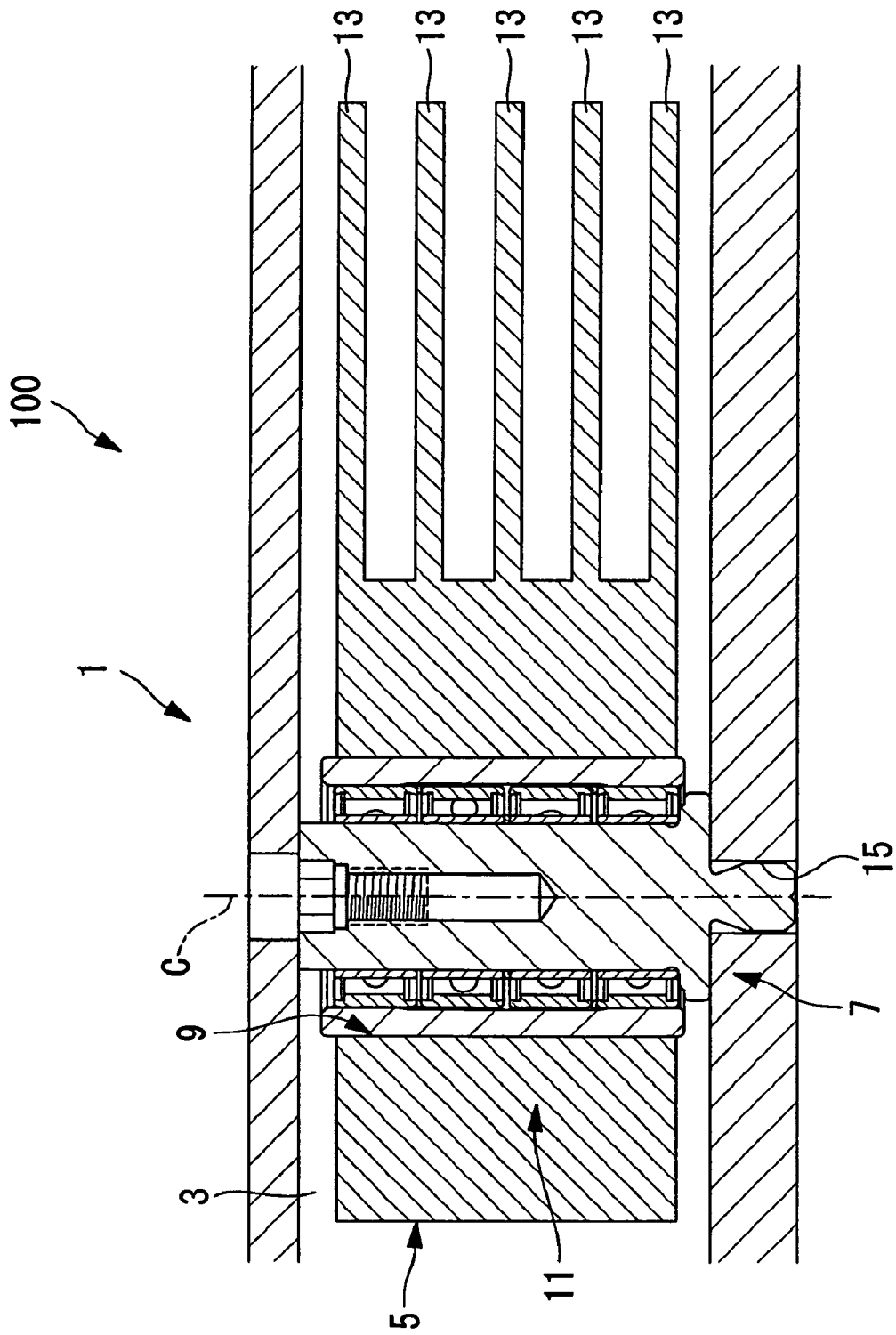
FIG. 1 is a longitudinal sectional view of a hard disk drive device including the bearing unit of a pivot device according to an embodiment of the present invention.

A pivot device 1 according to this embodiment is used, as illustrated in FIG. 1, for example, in a hard disk drive device 100. Note that, while in this embodiment, the description is made while using a hard disk drive device 100 specified for four hard disks as an example, the number of the hard disks (not shown) may be changed as required.

The pivot device 1 includes a base housing (base member) 3, a swing arm 5 capable of oscillating with respect to the base housing 3, and a bearing unit 7 supporting the swing arm 5 with respect to the base housing 3 so as to rock freely.

The swing arm 5 includes a tubular main body 11 having a bearing-fitting hole 9 into which the bearing unit 7 is fitted, a plurality of (five, in this case) arm portions 13 which are disposed in a multistage manner in an axial direction of the tubular main body 11, and magnetic heads (not shown) which are provided to leading ends of the arm portions and which write magnetic information in the hard disk and read the recorded magnetic information.

The swing arm 5 is pivoted or rocked, by a drive section (not shown) such as a voice coil motor, around a rotation axis C with the bearing unit 7 using as a fulcrum, thereby allowing the magnetic heads to access desired positions of the four stacked hard disks.

Figure 2:
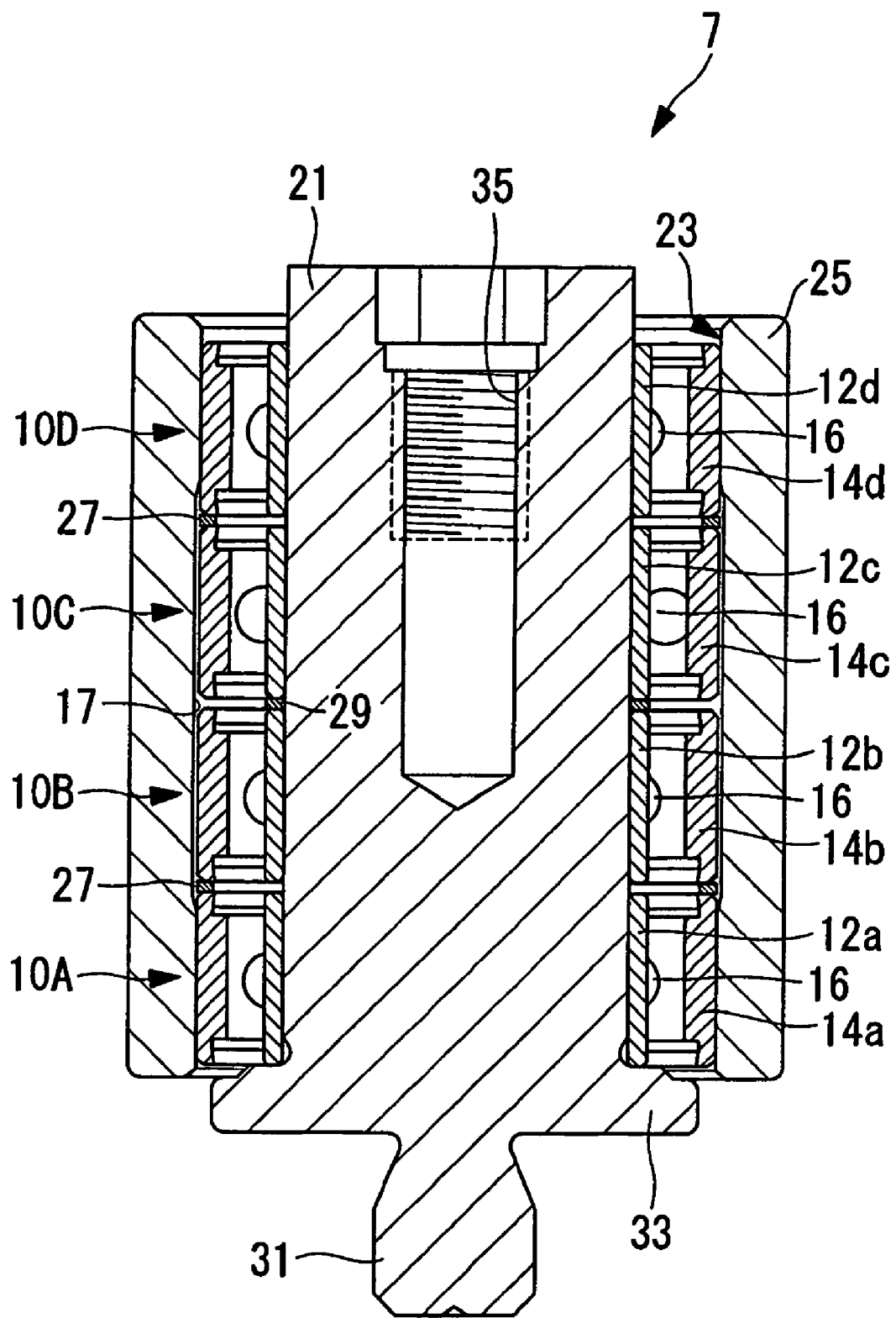
FIG. 2 is a longitudinal sectional view of a bearing unit of the pivot device of FIG. 1.

The bearing unit 7 includes, as illustrated in FIG. 2, four rolling bearings 10A, 10B, 10C, and 10D which are disposed in the axial direction with predetermined intervals, a shaft (first member) 21 which is fitted to the rolling bearings 10A, 10B, 10C, and 10D, a cylindrical sleeve (second member) 25 having a fitting hole 23 into which the rolling bearings 10A, 10B, 10C, and 10D are fitted, and large diameter spacers 27 and a small diameter spacer 29 which are sandwiched between the rolling bearings 10A, 10B, 10C, and 10D.

The rolling bearings 10A, 10B, 10C, and 10D are provided for making relative rotation of the shaft 21 and the sleeve 25 around the rotation axis C. The rolling bearings 10A, 10B, 10C, and 10D include inner races 12a, 12b, 12c, and 12d and outer races 14a, 14b, 14c, and 14d which are disposed coaxially with each other, and a plurality of rolling elements 16 which are incorporated in an annular space between the inner races 12a, 12b, 12c, and 12d and the outer races 14a, 14b, 14c, and 14d in a circumferential direction with intervals.

In an outer peripheral surface of the inner races 12a, 12b, 12c, and 12d of the rolling bearings 10A, 10B, 10C, and 10D, there is provided an inner race track of deep-groove shape or angular shape. Further, in each inner peripheral surface of the outer races 14a, 14b, 14c, and 14d, there is provided an outer race track of deep-groove shape or angular shape.

The shaft 21 is a substantially cylindrical member, and disposed on the rotation axis C in the base housing 3. At one axial end of the shaft 21, there are provided a protrusion 31 for forming a male screw protruding axially outside the sleeve 25, and a collar-shaped flange portion 33, the entire periphery of which protrudes radially outside. In another axial end thereof, there is formed a screw hole 35 extending axially inside the shaft 21.

In the shaft 21, the protrusion 31 is fitted into a recess 15 on a lower end surface of the base housing 3, and an end surface of the flange portion 33 is brought into contact with the lower end surface of the base housing 3. Further, a screw (not shown) is inserted from the outside of the base housing 3 into the screw hole 35, and the shaft 21 is fixed by the screw to an upper end surface of the base housing 3.

Further, the rolling bearings 10A, 10B, 10C, and 10D are fitted to the shaft 21 in the axial direction with intervals (hereinafter, each of the rolling bearings is referred to as first rolling bearing 10A, second rolling bearing 10B, third rolling bearing 10C, and fourth rolling bearing 10D in the order from the flange portion 33 side). In the first rolling bearing 10A, the end surface of the inner race 12a is brought into contact with the flange portion 33.

The inner race 12a of the first rolling bearing 10A and the inner race 12b of the second rolling bearing 10B, and the inner race 12c of the third rolling bearing 10C and the inner race 12d of the fourth rolling bearing 10D are bonded by an adhesive to the outer peripheral surface of the shaft 21, in a state where each pair of the inner races 12a and 12b, and the inner races 12c and 12d is pressed in a direction of being adjacent to each other. Therefore, the rolling bearings 10A, 10B, 10C, and 10D are in a state where preload is applied to each pair of two rolling bearings, which are axially adjacent to each other. Further, the inner races 12a, 12b, 12c, and 12d, the outer races 14a, 14b, 14c, and 14d, and rolling elements 16 are brought into contact with each other without gap.

Further, in the shaft 21, each of the large diameter spacers 27 is fitted between the first rolling bearing 10A and the second rolling bearing 10B, and between the third rolling bearing 10C and the fourth rolling bearing 10D. Further, the small diameter spacer 29 is fitted between the second rolling bearing 10B and the third rolling bearing 10C.

The large diameter spacers 27 are ring-shaped members having an outer diameter dimension substantially equal to that of the outer races 14a, 14b, 14c, and 14d, and an inner diameter dimension slightly larger than that of the outer races 14a, 14b, 14c, and 14d. The small diameter spacer 29 is a ring-shaped member having an outer diameter dimension and an inner diameter dimension which are substantially equal to those of the inner races 12a, 12b, 12c, and 12d.

The sleeve 25 has the outer periphery, which is fitted to the bearing-fitting hole 9 of the swing arm 5. Further, the rolling bearings 10A, 10B, 10C, and 10D are fitted into the fitting hole 23 of the sleeve 25 in the axial direction. The sleeve 25 which is fitted to the swing arm 5 and the shaft 21 which is fixed to the base housing 3 are supported by the four rolling bearings 10A, 10B, 10C, and 10D, whereby larger rigidity can be obtained compared to the case of being supported by, for example, two rolling bearings.

In an inner surface of the fitting hole 23 of the sleeve 25, an axial central portion, specifically, the portion which faces the outer race 14b of the second rolling bearing 10B and the outer race 14c of the third rolling bearing 10C, has a shape shaved in the circumferential direction toward the radial outsides (hereinafter, the shaved portion of the inner surface of the fitting hole 23 is referred to as "inner surface recessed portion 17").

The inner peripheral surface of the fitting hole 23 and each of the outer peripheral surface of the outer race 14a of the first rolling bearing 10A and the outer peripheral surface of the outer race 14d of the fourth rolling bearing 10D are bonded to each other by the adhesive. Further, an axially extending radial gap is formed between confronting surfaces of the inner surface recessed portion 17 of the inner peripheral surface of the fitting hole 23, and the outer race 14b of the second rolling bearing 10B and the outer race 14c of the third rolling bearing 10C.

Next, an assembling method for the bearing unit 7 according to this embodiment is described.

Figure 3:
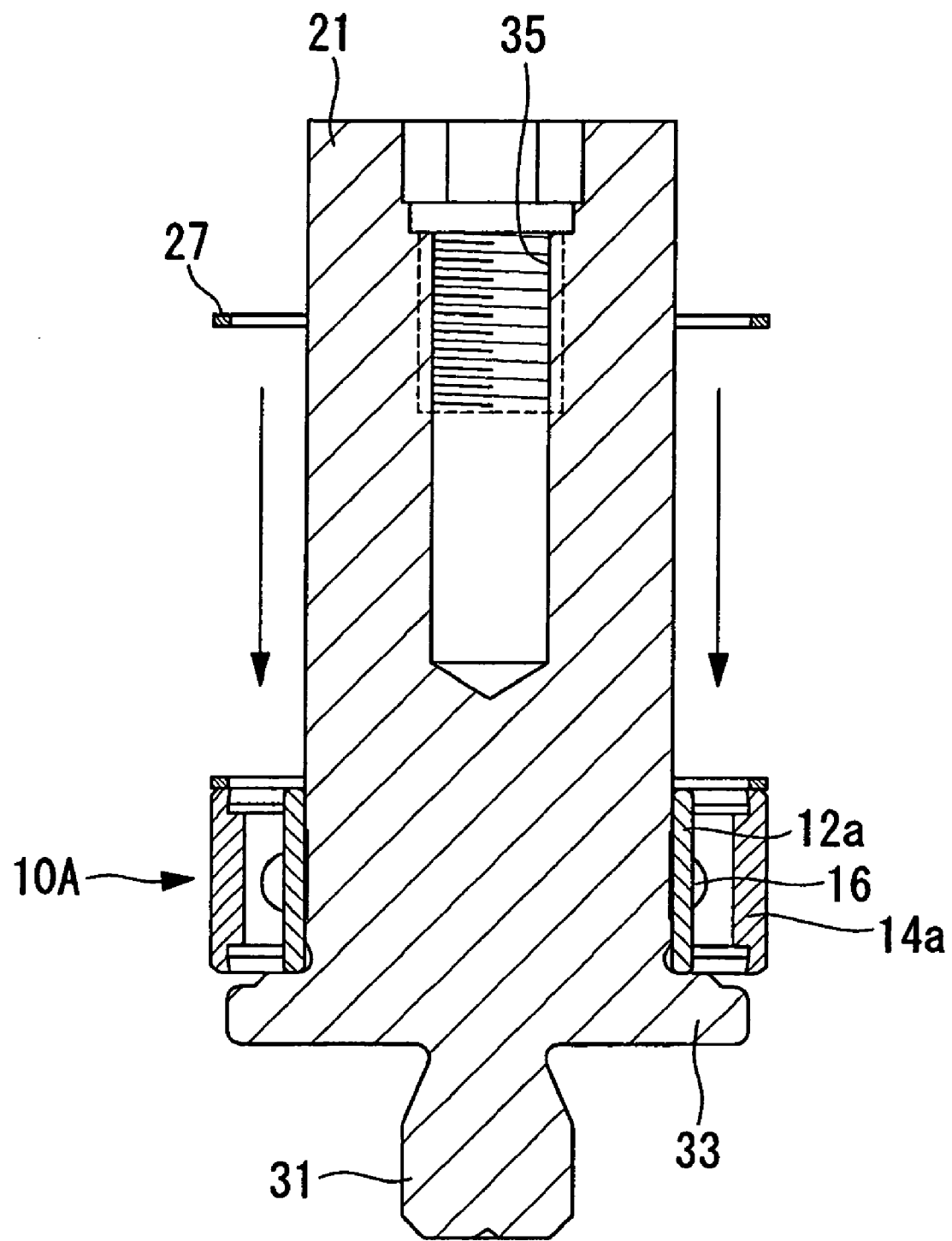
FIG. 3 is a longitudinal sectional view illustrating how a large diameter spacer is fitted to the shaft of FIG. 2.

First, the shaft 21 is supported while the protrusion 31 being directed downward in the vertical direction, and the adhesive is applied to a position, of the outer peripheral surface of the shaft 21, corresponding to the inner race 12a of the first rolling bearing 10A. Then, the inner race 12a of the first rolling bearing 10A is fitted to the shaft 21, and the end surface of the inner race 12a is brought into contact with the flange portion 33. Subsequently, as illustrated in FIG. 3, the large diameter spacer 27 is fitted to the shaft 21, and brought into contact with the end surface of the outer race 14a to be disposed coaxially with the outer race 14a.

Figure 4:
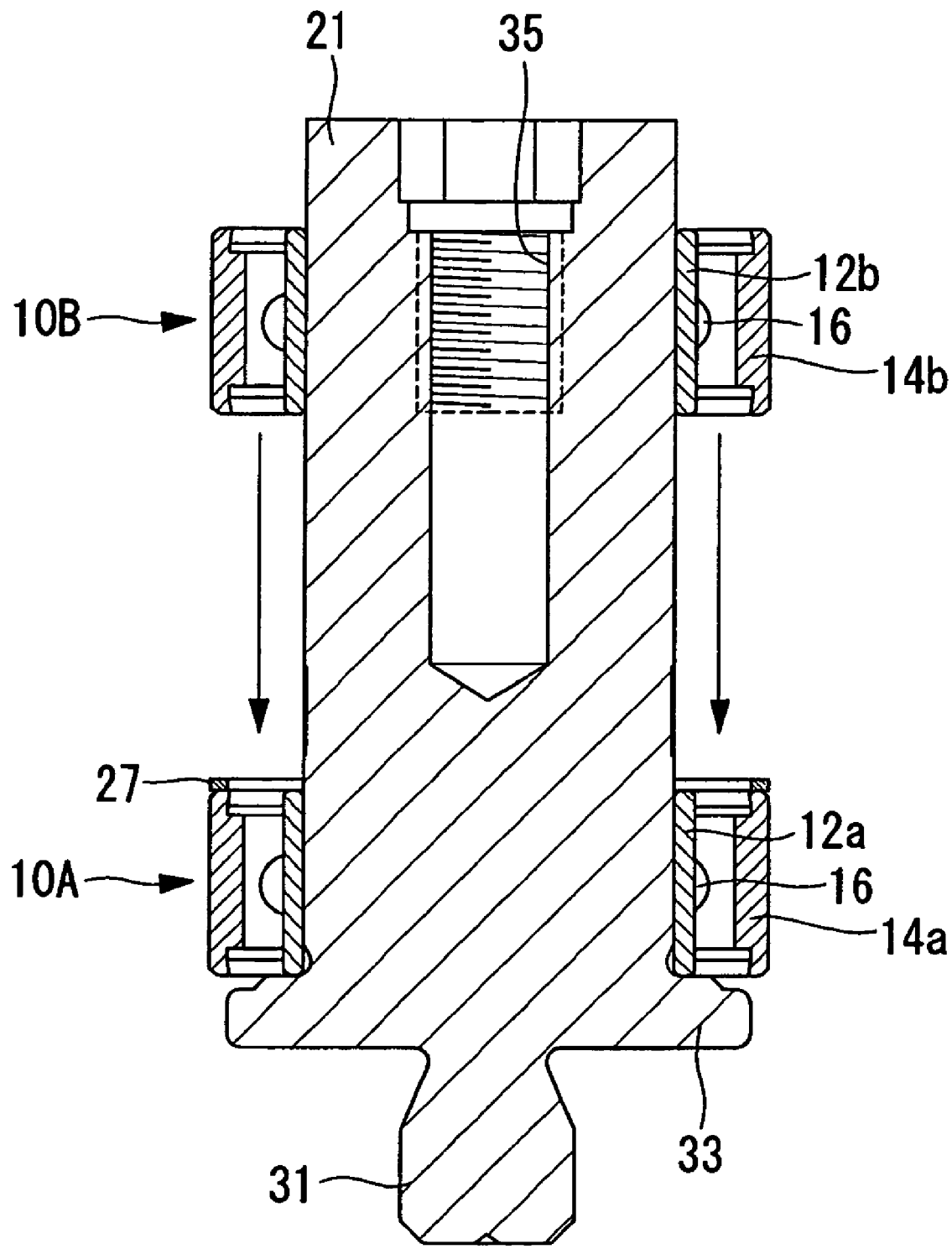
FIG. 4 is a longitudinal sectional view illustrating how a second rolling bearing is fitted to the shaft of FIG. 3.

Next, the adhesive is applied to the position, of the outer peripheral surface of the shaft 21, corresponding to the inner race 12b of the second rolling bearing 10B. Then, as illustrated in FIG. 4, the inner race 12b of the second rolling bearing 10B is fitted to the shaft 21, and the end surface of the outer race 14b is brought into contact with the large diameter spacer 27.

Figure 5:
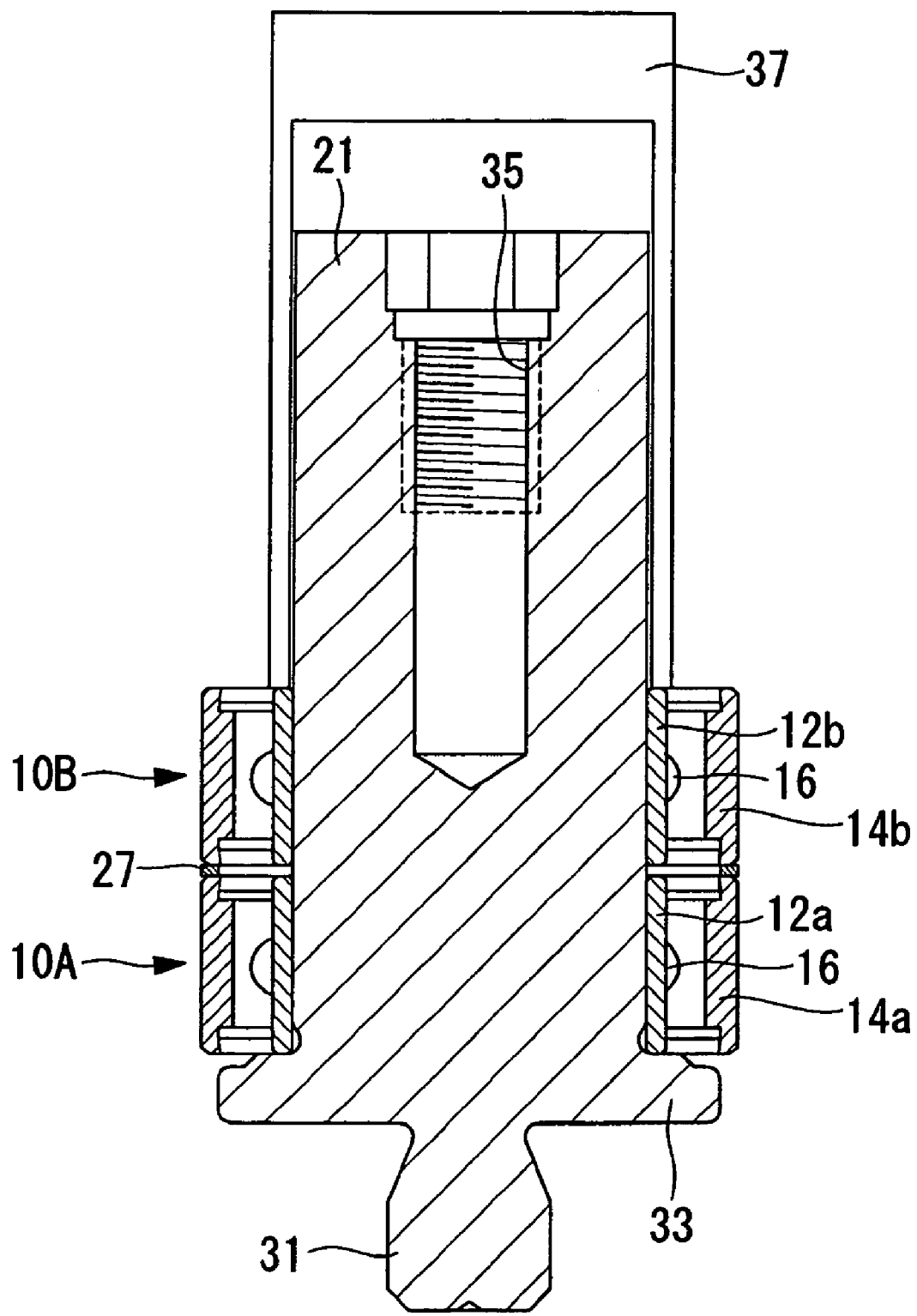
FIG. 5 is a longitudinal sectional view illustrating a state where a preload is applied to the first rolling bearing and the second rolling bearing of FIG. 4.

In this state, before the shaft 21 and each of the inner race 12a of the rolling bearing 10A and the inner race 12b of the rolling bearing 10B are completely bonded to each other, the preload is applied, as illustrated in FIG. 5, to the rolling bearings 10A and 10B by using a preload jig 37 having, at an axial leading end thereof, a cylindrical portion whose diameter dimension is substantially the same as that of the inner races 12a and 12b of the rolling bearings 10A and 10B. Specifically, the leading end of the cylindrical portion of the preload jig 37 is brought into contact with the axial end surface of the inner race 12b of the rolling bearing 10B, and the inner race 12b is pressed in a direction toward the inner race 12a.

As a result, there are eliminated gaps between the rolling elements 16 and the inner races 12a and 12b, and the outer races 14a and 14b of the rolling bearings 10A and 10B, and hence it is possible to apply preload to the rolling bearings 10A and 10B. Further, by completely bonding together the outer peripheral surface of the shaft 21 and the inner peripheral surfaces of the inner races 12a and 12b in a state where the inner race 12a and the inner race 12b are pressed in a direction of being adjacent to each other, it is possible to keep a pre-loaded state.

Figure 6:
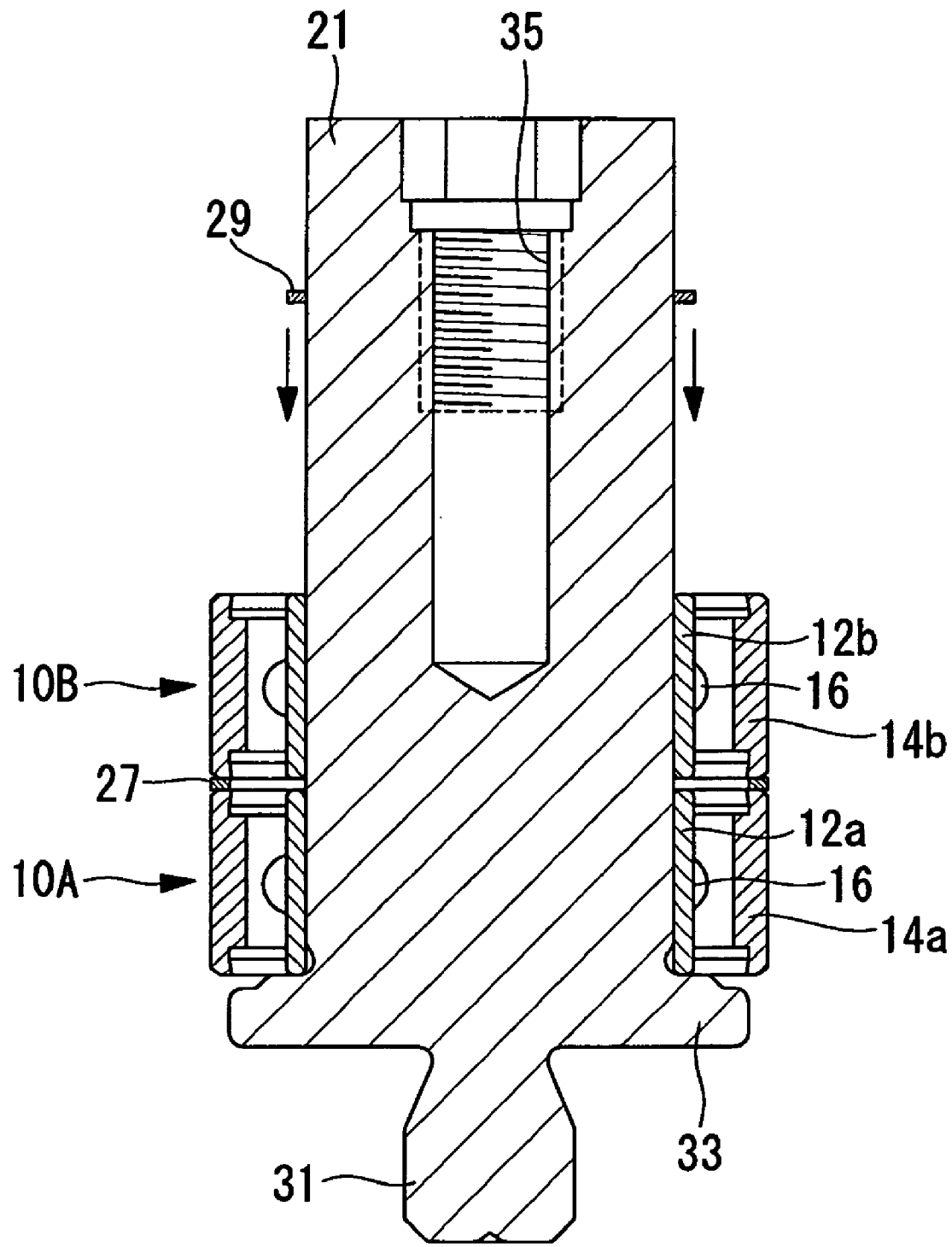
FIG. 6 is a longitudinal sectional view illustrating how a small diameter spacer is fitted to the shaft of FIG. 5.

Next, as illustrated in FIG. 6, the small diameter spacer 29 is fitted to the shaft 21, and brought into contact with the end surface of the inner race 12b of the second rolling bearing 10B to be disposed coaxially with the inner race 12b.

Figure 7:
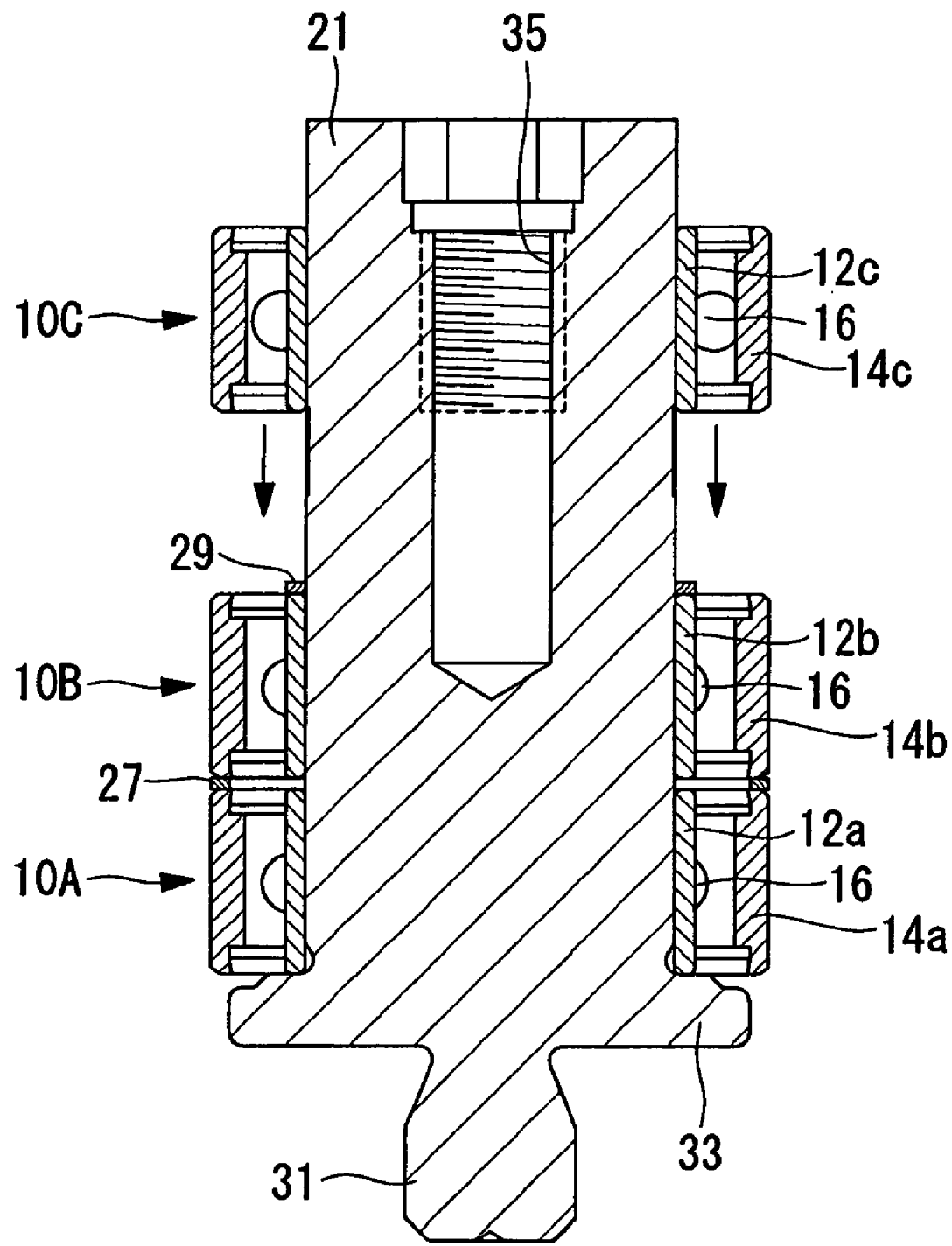
FIG. 7 is a longitudinal sectional view illustrating how a third rolling bearing is fitted to the shaft of FIG. 6.

Subsequently, the adhesive is applied to a position, of the outer peripheral surface of the shaft 21, corresponding to the inner race 12c of the third rolling bearing 10C. Then, as illustrated in FIG. 7, the inner race 12c of the third rolling bearing 10C is fitted to the shaft 21, and the end surface of the inner race 12c is brought into contact with the small diameter spacer 29.

Figure 8:
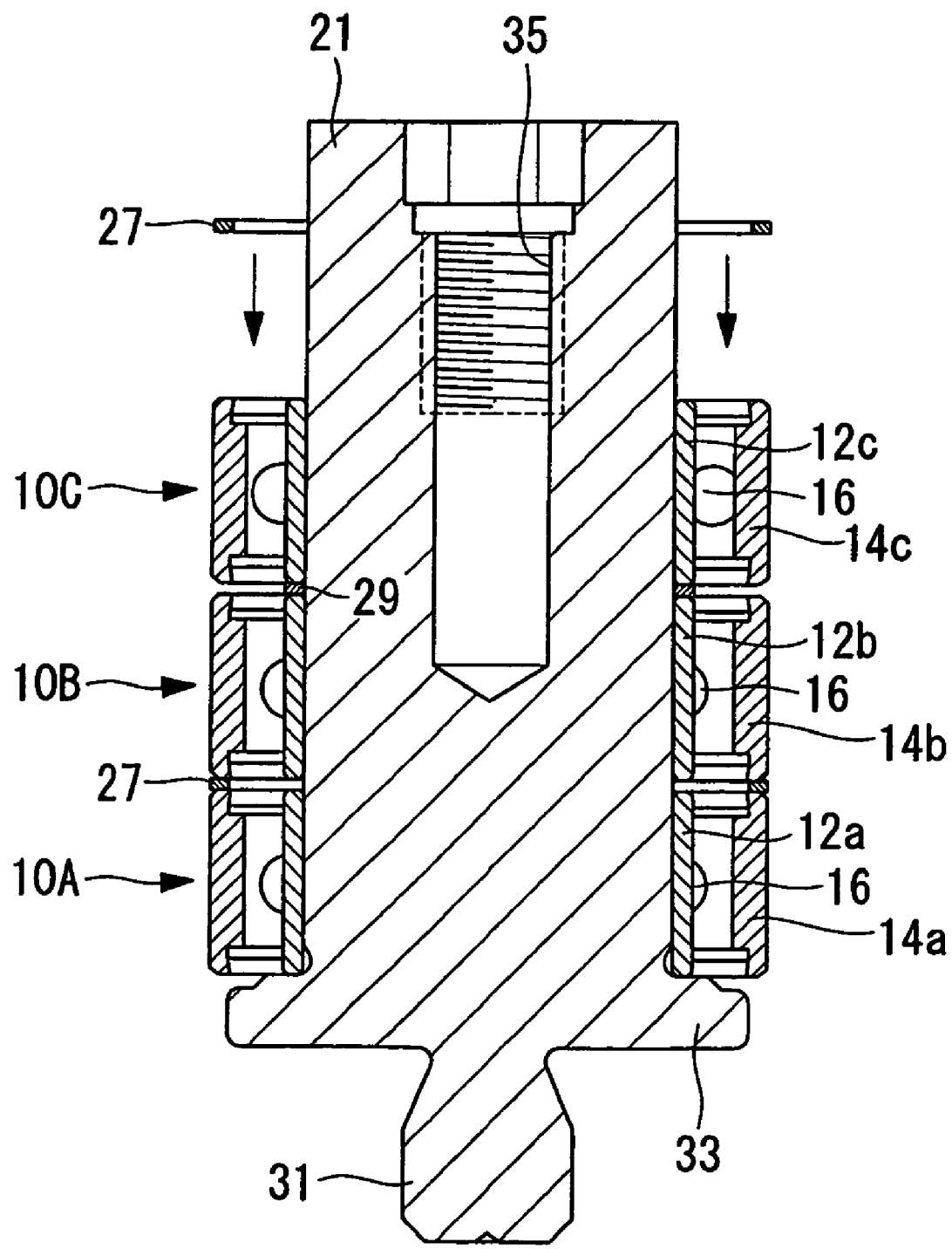
FIG. 8 is a longitudinal sectional view illustrating how the large diameter spacer is fitted to the shaft of FIG. 7.

Subsequently, as illustrated in FIG. 8, the large diameter spacer 27 is fitted to the shaft 21, and brought into contact with the end surface of the outer race 14c to be disposed coaxially with the outer race 14c.

Figure 9:
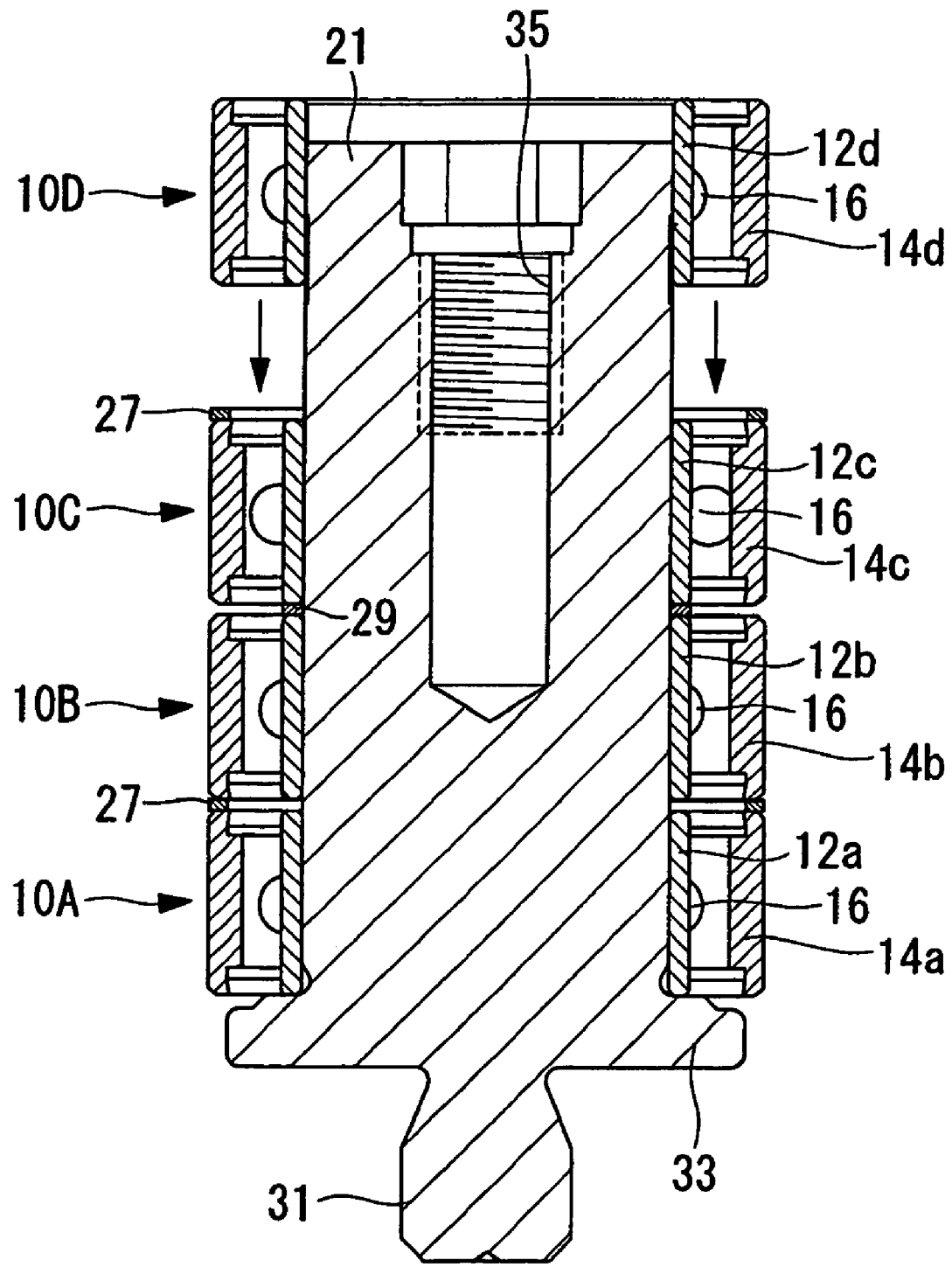
FIG. 9 is a longitudinal sectional view illustrating how a fourth rolling bearing is fitted to the shaft of FIG. 8.

Next, the adhesive is applied to the position, of the outer peripheral surface of the shaft 21, corresponding to the inner race 12d of the fourth rolling bearing 10D. Then, as illustrated in FIG. 9, the inner race 12d of the fourth rolling bearing 10D is fitted to the shaft 21, and the end surface of the outer ring 14d is brought into contact with the large diameter spacer 27.

Figure 10:
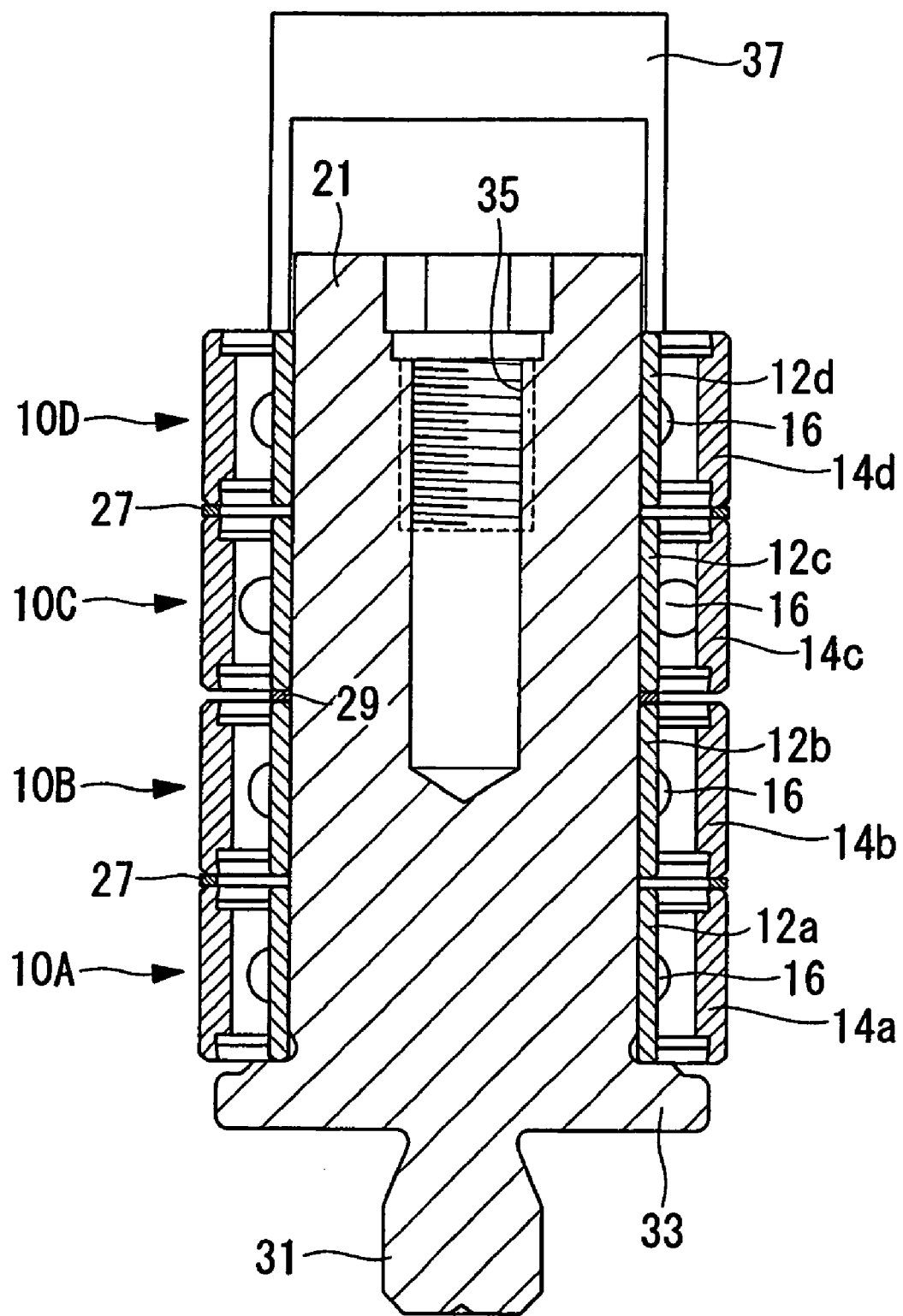
FIG. 10 is a longitudinal sectional view illustrating a state where a preload is applied to the third rolling bearing and the fourth rolling bearing of FIG. 9.

In this state, before the shaft 21 and each of the inner race 12c of the rolling bearing 10C and the inner race 12d of the rolling bearing 10D are completely bonded to each other, as illustrated in FIG. 10, the leading end of the cylindrical portion of the preload jig 37 is brought into contact with the axial end surface of the inner race 12d of the rolling bearing 10D, and the inner race 12d is pressed in a direction the inner race 12c.

As a result, there are eliminated gaps between the rolling elements 16 and the inner races 12c and 12d, and the outer races 14c and 14d of the rolling bearings 10C and 10D, and hence it is possible to apply preload to the rolling bearings 10C and 10D. Further, by completely bonding together the outer peripheral surface of the shaft 21 and the inner peripheral surface of the inner races 12c and 12d in a state where the inner race 12c and the inner race 12d are pressed in a direction toward each other, it is possible to keep a pre-loaded state.

A gap between the inner races 12a and 12b and a gap between the inner races 12c and 12d are determined by the length of the large diameter spacers 27, and hence it is possible to apply preload to the rolling bearings 10A and 10B, and the rolling bearings 10C and 10D by only pressing each pair of the inner races 12a and 12b, and the inner races 12c and 12d so in the direction of being adjacent to each other each other as described above.

By applying preload to the rolling bearings 10A, 10B, 10C, and 10D, it is possible to ensure rigidity of the bearing unit 7 and to improve rotation accuracy thereof. Further, by keeping a pre-loaded state after bonding, it is possible to prevent preload lack, thereby preventing deterioration of the rotation accuracy of the bearing unit 7.

In this case, the sleeve 25 and the shaft 21 are supported by the four rolling bearings 10A, 10B, 10C, and 10D. Therefore, for example, compared with a case where the sleeve 25 and the shaft 21 are supported only by two rolling bearings interposing the spacer therebetween, the load applied to each of the rolling bearings 10A, 10B, 10C, and 10D becomes smaller. Therefore, it is possible to set the preload applied to the rolling bearings 10A, 10B, 10C, and 10D small, and hence pressure acting on the rolling elements can be reduced. As a result, it is possible to extend the life of the rolling elements 16, and to suppress generation of sudden torque variation.

Figure 11:
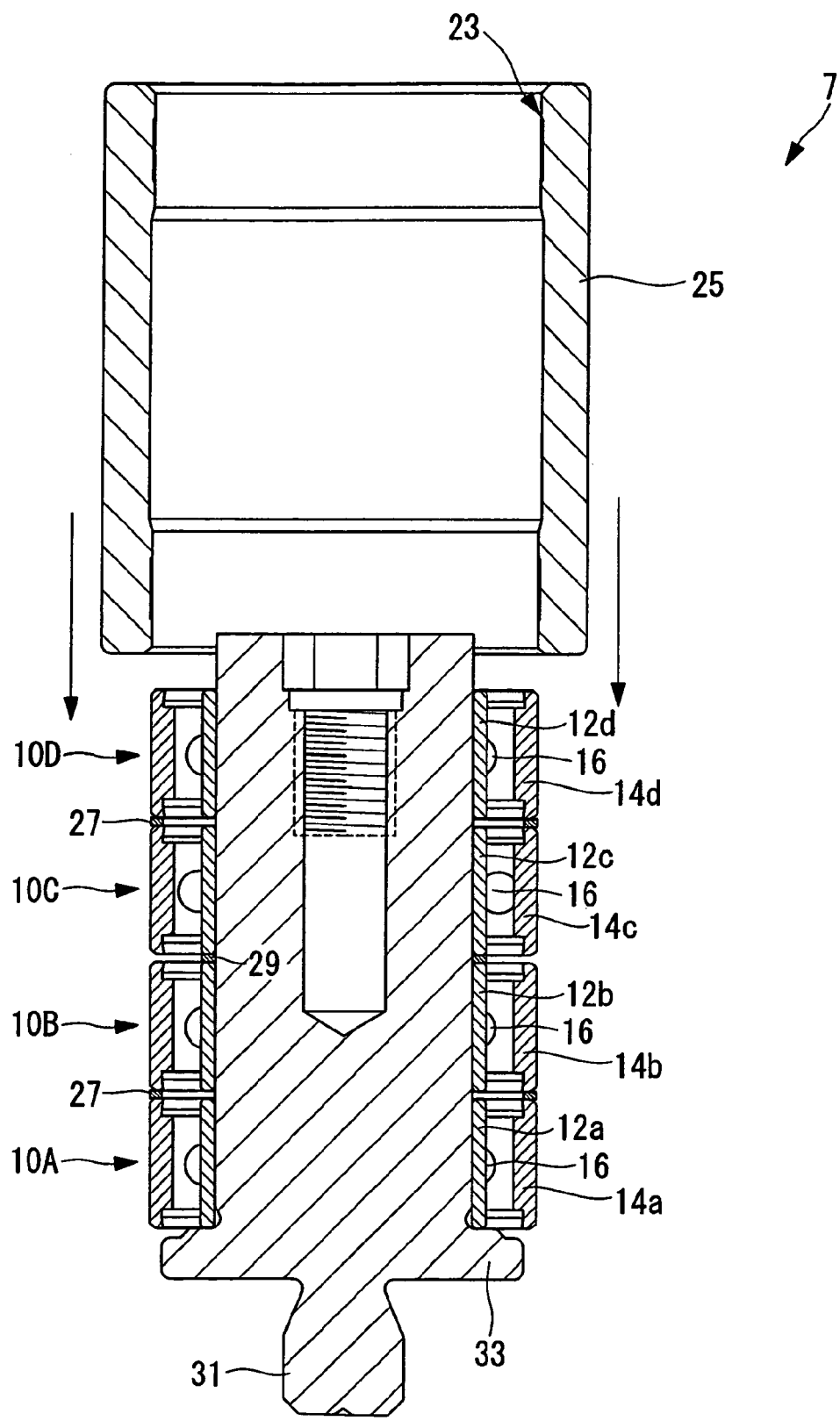
FIG. 11 is a longitudinal sectional view illustrating how a sleeve is fitted to the shaft of FIG. 10.

Next, the adhesive is applied to the positions, of the inner peripheral surface of the fitting hole 23 of the sleeve 25, corresponding to the first rolling bearing 10A and the fourth rolling bearing 10D. Then, as illustrated in FIG. 11, the sleeve 25 is fitted to the outer races 14a, 14b, 14c, and 14d of the rolling bearings 10A, 10B, 10C, and 10D which are fitted to the shaft 21, and the inner peripheral surface of the fitting hole 23 of the sleeve 25 and the outer peripheral surface of the outer races 14a and 14d of the rolling bearings 10A and 10D are bonded to each other. By the outer races 14a and 14d of the rolling bearings 10A and 10D, the position having a space in the axial direction of the sleeve 25 is fixed, whereby the sleeve 25 can be stably held.

Next, effects of the pivot device 1 including the bearing unit the above-mentioned bearing unit 7 are described.

By an operation of the drive section, the swing arm 5 is swing or pivoted (rocked) with the bearing unit 7 as a fulcrum. Specifically, in the bearing unit 7 serving as the fulcrum of the swing arm 5, due to rolling of the rolling elements 16 sandwiched between the inner races and the outer races of the rolling bearings 10A, 10B, 10C, and 10D, the sleeve 25 fitted into the bearing-fitting hole 9 of the swing arm 5 is relatively rotated with respect to the shaft 21 fixed to the base housing 3.

As a result, the swing arm 5 is rocked or swung around the rotation axis C with respect to the base housing 3, and the magnetic heads are reciprocated on each hard disk. When the swing arm 5 is operated at high speed, the magnetic heads are instantaneously moved to data recorded in a predetermined position of the hard disks. Then, the magnetic heads read and write magnetic information recorded in the hard disks.

In the bearing unit 7 according to this embodiment, a radial gap is formed between the inner peripheral surface of the fitting hole 23 of the sleeve 25, and the outer race 14b of the second rolling bearing 10B and the outer race 14c of the third rolling bearing 10C, and the adhesive is not applied therebetween.

Figure 12:
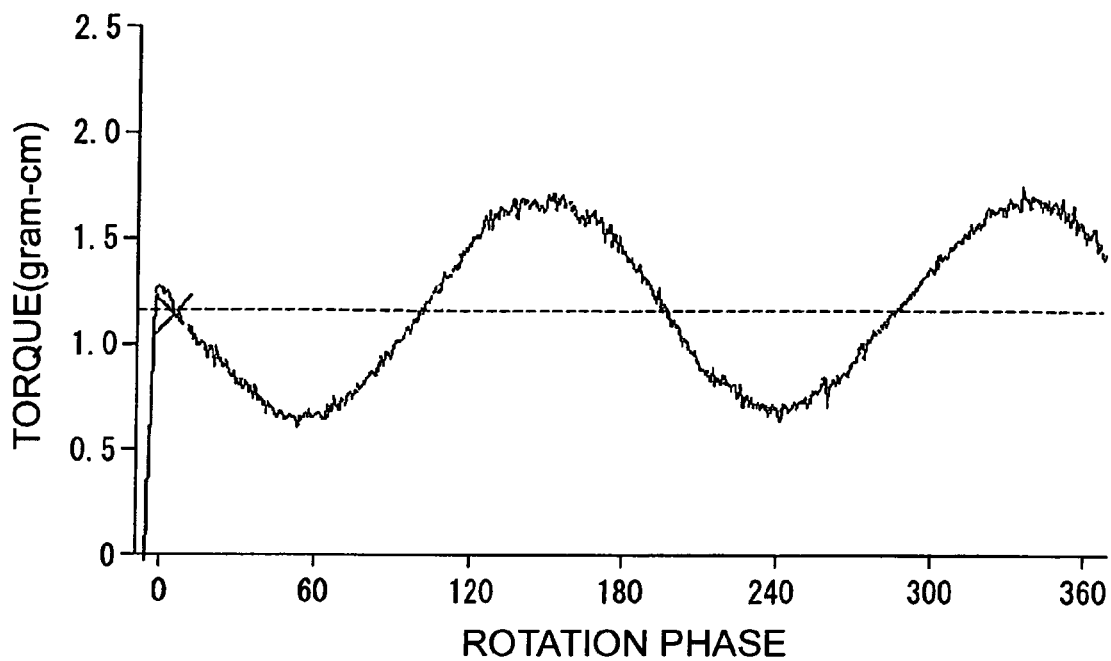
FIG. 12 is a graph illustrating a relation between torque and a rotation phase in a bearing unit in which an adhesive is applied to the outer races of the central two rolling bearings.

For example, in a case where the adhesive is applied between the inner peripheral surface of the fitting hole 23 and the outer peripheral surface of the outer races 14b and 14c of the rolling bearings 10B and 10C to thereby effect bonding therebetween, expansion and contraction of the adhesive results in a change of circularity of the rolling contact surface of the outer races 14b and 14c, and the stress is applied to the rolling contact surface of the outer races 14b and 14c and the rolling elements 16. In this case, unstable wave torque and resonance are caused, and a relation between torque and a rotation phase is represented by an undulate torque waveform as illustrated in FIG. 12.

Figure 13:
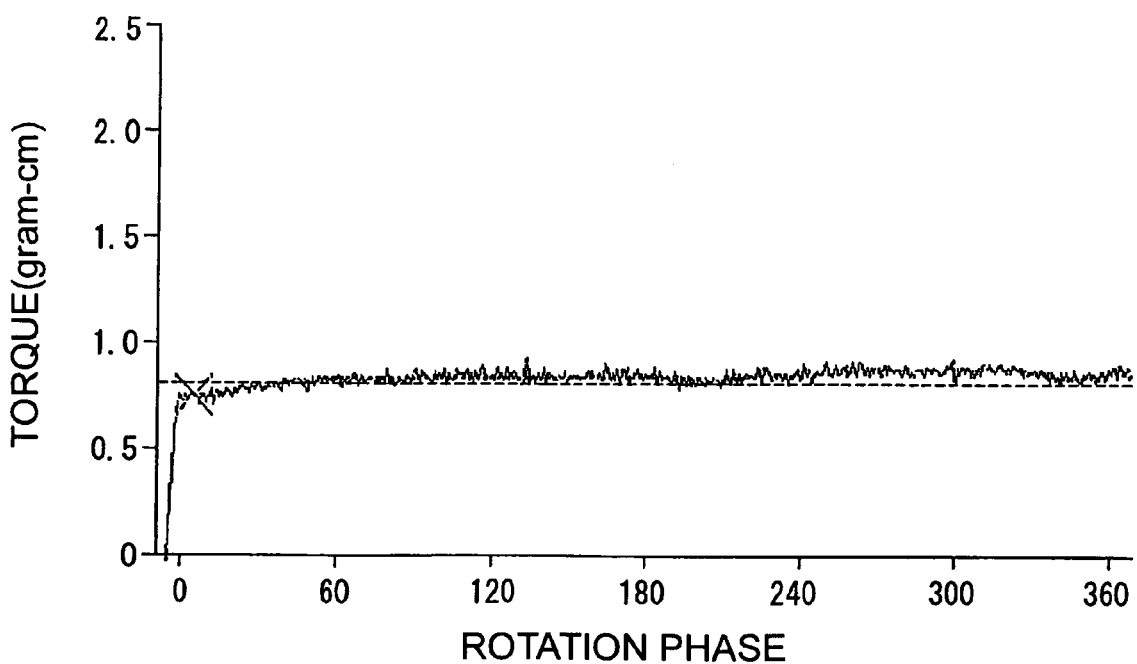
FIG. 13 is a graph illustrating a relation between torque and a rotation phase in the bearing unit of the present invention.

On the contrary, according to the bearing unit 7, there is no change in circularity due to the expansion and contraction of the adhesive in the rolling contact surface of the outer races 14b and 14c of the central two rolling bearings 10B and 10C, and hence the stress is not applied to the rolling contact surface and the rolling elements 16. Therefore, the torque and the resonance can be stabilized as much as possible, and it is possible to obtain a relation between the torque and the rotation phase as represented by the flat torque waveform illustrated in FIG. 13.

In the bearing unit 7 according to this embodiment and the pivot device 1 including the bearing unit 7, it is possible to provide the bearing unit 7 having a long life and capable of stabilizing the torque and the resonance as much as possible. Due to the above-mentioned bearing unit 7, it is possible to stably rock the swing arm 5 with respect to the base housing 3 of the pivot device 1.

Note that, the present invention can be modified as described below.

For example, the fitting hole 23 of the sleeve 25 may have a flat inner surface, and an axial central portion of the outer peripheral surface of the shaft 21, specifically, a portion which faces the inner race 12b of the second rolling bearing 10B and the inner race 12c of the third rolling bearing 10C, may have a shape which is shaved radially inward in the circumferential direction, thereby forming a radial gap between the inner race 12b of the second rolling bearing 10B and the inner race 12c of the third rolling bearing 10C.

In this case, the small diameter spacer 29 may be fitted between the first rolling bearing 10A and the second rolling bearing 10B, and between the third rolling bearing 10C and the fourth rolling bearing 10D, and the large diameter spacer 27 may be fitted between the second rolling bearing 10B and the third rolling bearing 10C. The outer race 14a of the first rolling bearing 10A and the outer race 14b of the second rolling bearing 10B, and the outer race 14c of the third rolling bearing 10C and the outer race 14d of the fourth rolling bearing 10D may be bonded to the inner peripheral surface of the fitting hole 23 of the sleeve 25, in a state where each pair of the outer races 14a and 14b, and the outer races 14c and 14d is pressed in a direction of being adjacent to each other. Further, the outer peripheral surface of the shaft 21, and the inner peripheral surface of the inner race 12a of the first rolling bearing 10A and the inner peripheral surface of the inner race 12d of the fourth rolling bearing 10D may be bonded to each other.

With this configuration, it is possible to fix the position with axial intervals of the shaft 21 by the inner races 12a and 12d of the rolling bearings 10A and 10D to stably retain the shaft 21. At the same time, it is possible to form a radial gap between confronting surfaces of the outer peripheral surface of the shaft 21, and the inner race 12b of the second rolling bearing 10B and the inner race 12c of the third rolling bearing 10C to prevent a change in circularity of the rolling contact surface of the inner races 12b and 12c. Therefore, it is possible to prevent application of the stress with respect to the rolling contact surface of the inner races 12b and 12c of the central two rolling bearings 10B and 10C and the rolling element 16, whereby the torque and the resonance can be stabilized as much as possible also in this case.

In the above-mentioned embodiment, bonding is performed between the sleeve 25, and the outer race 14a of the first rolling bearing 10A and the outer race 14d of the fourth rolling bearing 10D, and between the shaft 21, and the inner race 12a of the first rolling bearing 10A and the inner race 12d of the fourth rolling bearing 10D. However, it is also possible to fix the outer races 14a and 14d of the rolling bearings 10A and 10D to the sleeve 25, or fix the inner races 12a and 12d of the rolling bearings 10A and 10D to the shaft 21 by performing fitting through press-fitting and the like without using the adhesive.

What is claimed is:
1. A bearing unit, comprising:
four rolling bearings disposed so as to be adjacent to each other in an axial direction and forming two adjacent pairs of rolling bearings, each of the four rolling bearings including an inner race and a corresponding outer race disposed coaxially with each other, and a plurality of rolling elements disposed between the inner race and the outer race with intervals in a circumferential direction;
a first member, which is fitted to the inner race of each of the rolling bearings; and
a second member, which includes a fitting hole into which the outer race of each of the rolling bearings is fitted, wherein
the four rolling bearings are disposed in the axial direction so that the inner races or the outer races of each pair of rolling bearings are brought into contact with each other in the axial direction while the corresponding outer races or the corresponding inner races thereof are disposed with intervals in the axial direction, the inner races or the outer races of the rolling bearings at both axial ends, which are brought into contact with the inner races or the outer races of the adjacent rolling bearings, are fixed to the first member or the second member, and the inner races or the outer races of the central two rolling bearings, which are disposed with intervals in the axial direction, are disposed so as to form a radial gap between confronting surfaces of the first member and the inner races or between confronting surfaces of the second member and the outer races.

2. A bearing unit according to claim 1; wherein a spacer is sandwiched between the inner races or the outer races of the four rolling bearings, which are brought into contact with each other in the axial direction.

3. A pivot device, comprising:
a base member;
a swing arm; and
the bearing unit according to claim 2, which supports the swing arm with respect to the base member so that the swing arm can freely swing.

4. A pivot device, comprising:
a base member;
a swing arm; and
the bearing unit according to claim 1, which supports the swing arm with respect to the base member so that the swing arm can freely swing.

5. A bearing unit, comprising:
four rolling bearings disposed adjacent one another in an axial direction and forming two adjacent pairs of rolling bearings, each of the four roller bearings having an inner race and an outer race disposed coaxially with each other, and a plurality of rolling elements disposed between the inner and outer races;
a first member fitted to the inner race of each of the rolling bearings; and
a second member having a fitting hole into which the outer race of each of the rolling bearings is fitted, wherein
the rolling bearings in each pair are in a preloaded state,
the inner races or the outer races of the two end rolling bearings are fixed to the first member or the second member, and
the inner races or the outer races of the two central rolling bearings form a radial gap between confronting surfaces of the first member and the inner races or between confronting surfaces of the second member and the outer races.

6. A bearing unit according to claim 5; wherein the two pairs of rolling bearings are axially separated by a spacer.

7. A bearing unit according to claim 5; wherein the radial gap extends in the axial direction throughout the axial extent of the two central rolling bearings.

8. A bearing unit according to claim 7; wherein the inner races or the outer races of the two central rolling bearings that do not form the radial gap are fixed to the first member or the second member.

9. A bearing unit according to claim 5; wherein the inner races or the outer races of the two central rolling bearings that do not form the radial gap are fixed to the first member or the second member.

10. A bearing unit according to claim 5; wherein the inner races or the outer races, but not both, of the rolling bearings in each pair are axially separated by a spacer.

11. A bearing unit according to claim 5; wherein the inner races of the four rolling bearings are fixed by adhesive to the first member, the outer races of the two end rolling bearings are fixed by adhesive to the second member, and the outer races of the two central rolling bearings are spaced by the radial gap from, and not fixed by adhesive to, the second member.

12. A bearing unit according to claim 5; wherein the outer races of the four rolling bearings are fixed by adhesive to the second member, the inner races of the two end rolling bearings are fixed by adhesive to the first member, and the inner races of the two central rolling bearings are spaced by the radial gap from, and not fixed by adhesive to, the first member.

13. A pivot device, comprising:
a base member;
a swing arm; and
the bearing unit according to claim 5, which supports the swing arm with respect to the base member so that the swing arm can freely swing.

* * * * *